United States Patent
Tanida

(10) Patent No.: US 9,616,877 B2
(45) Date of Patent: Apr. 11, 2017

(54) VEHICLE CONTROL DEVICE AND METHOD OF CONTROLLING THE SAME

(71) Applicant: HONDA MOTOR CO., LTD., Minato-ku, Tokyo (JP)

(72) Inventor: Koji Tanida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 14/276,358

(22) Filed: May 13, 2014

(65) Prior Publication Data

US 2014/0342875 A1 Nov. 20, 2014

(30) Foreign Application Priority Data

May 15, 2013 (JP) .................................. 2013-102657

(51) Int. Cl.
| | |
|---|---|
| *B60W 10/11* | (2012.01) |
| *B60W 10/06* | (2006.01) |
| *B60W 10/18* | (2012.01) |
| *B60W 30/18* | (2012.01) |

(52) U.S. Cl.
CPC ............ *B60W 10/11* (2013.01); *B60W 10/06* (2013.01); *B60W 10/182* (2013.01); *B60W 30/181* (2013.01); *B60W 2510/101* (2013.01); *B60W 2510/1005* (2013.01); *B60W 2520/04* (2013.01); *B60W 2540/06* (2013.01); *B60W 2710/1005* (2013.01); *B60Y 2400/76* (2013.01); *Y10T 477/688* (2015.01)

(58) Field of Classification Search
None
See application file for complete search history.

(56) References Cited

U.S. PATENT DOCUMENTS

| | | | | |
|---|---|---|---|---|
| 2012/0271488 A1* | 10/2012 | You | ......................... | B60R 25/00 701/2 |
| 2013/0158838 A1* | 6/2013 | Yorke | ................... | B60W 10/06 701/103 |

FOREIGN PATENT DOCUMENTS

| | | |
|---|---|---|
| JP | S59175659 A | 10/1984 |
| JP | H0127841 Y2 | 8/1989 |
| JP | H03-6164 U | 1/1991 |
| JP | 2007170546 A | 7/2007 |
| JP | 2009073416 A | 4/2009 |
| WO | 2013038446 A1 | 3/2013 |

OTHER PUBLICATIONS

Office Action issued Sep. 20, 2016 for counterpart Japanese Patent Application No. 2013-102657.

* cited by examiner

*Primary Examiner* — Erin D Bishop
(74) *Attorney, Agent, or Firm* — Carrier Blackman & Associates, P.C.; Joseph P. Carrier; Jingli Wang

(57) ABSTRACT

While an engine (drive source) is being driven, when a long pressing operation (selection operation on a predetermined shift range) on an N-range button via a SBW shifter is executed, an engine drive/stop button blinks to notify a driver (step S1 and step S2). During the blinking of the engine drive/stop button, when the engine drive/stop button is pressed and the engine (drive source) is stopped, a neutral range is maintained without being switched to a parking range automatically (step 3 and step 4).

18 Claims, 2 Drawing Sheets

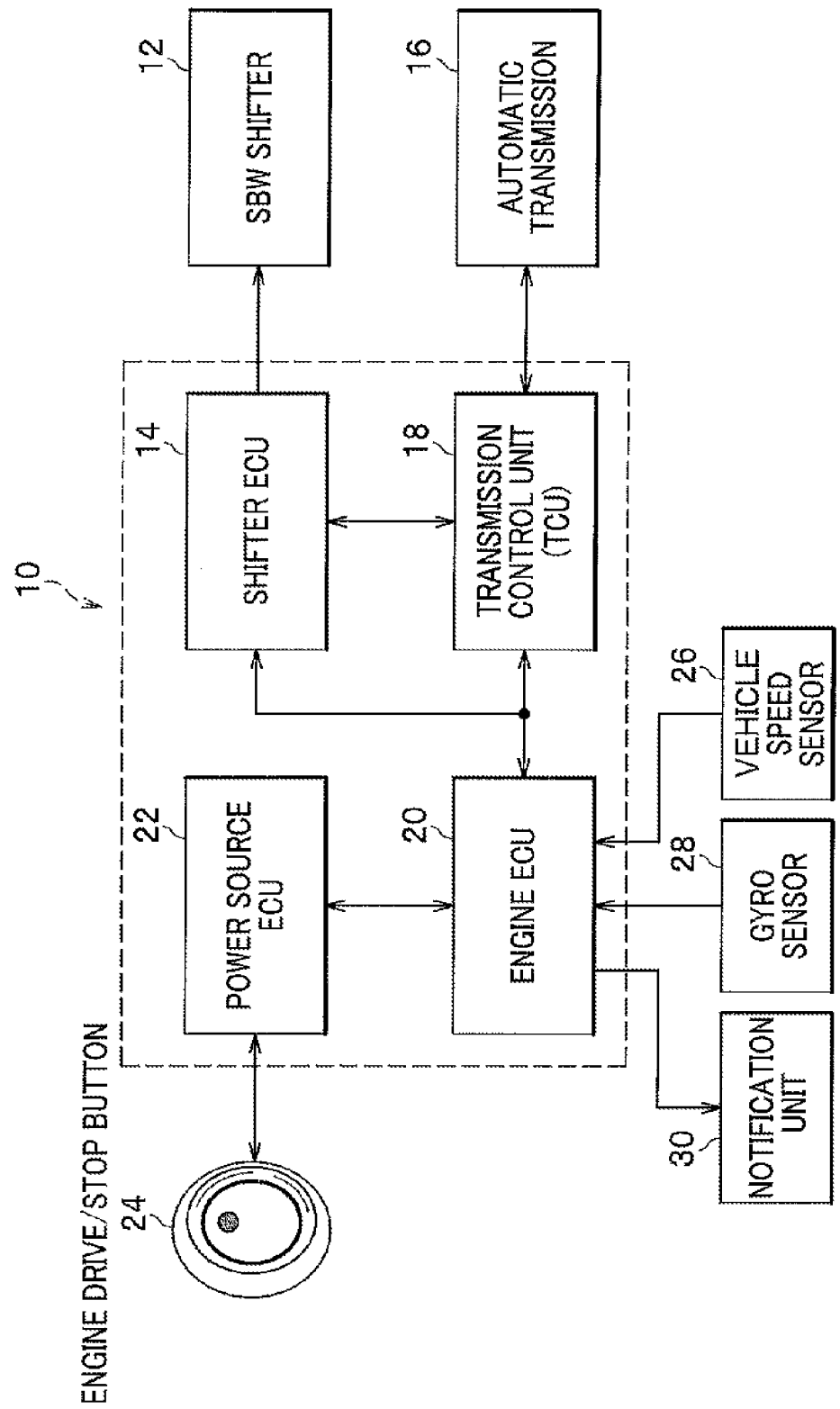

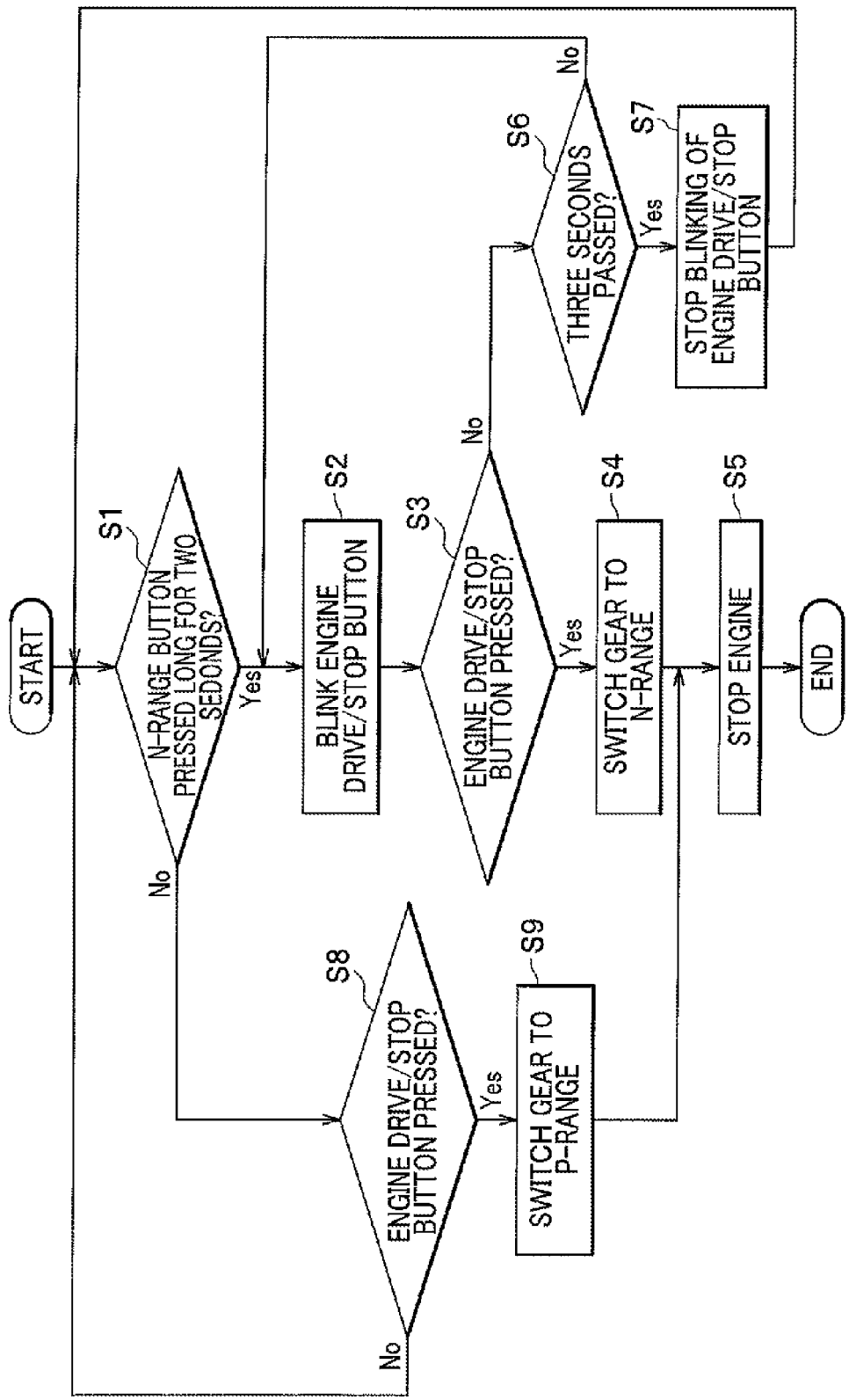

VEHICLE CONTROL DEVICE AND METHOD OF CONTROLLING THE SAME

CROSS REFERENCE TO RELATED APPLICATION

This application claims the priority of Japanese Patent Application No. 2013-102657, filed on May 15, 2013, the entire specification, claims and drawings of which are incorporated herewith by reference.

BACKGROUND OF THE INVENTION

Field of the Invention

The invention relates to a vehicle control device having a control unit which switches a shift range of an automatic transmission by an actuator and a method of controlling the same.

Description of the Related Arts

For example, Patent Literature 1 (JP03-006164U) discloses a parking device which electrically detects a shift range operation by a driver and has a switching unit which switches a shift range of an automatic transmission by electric signals.

When an ignition switch is off and a vehicle stops or almost stops with a vehicle speed equal to or less than a predetermined speed, the parking device is set as follows. The shift range is automatically switched to a parking range (P-range) by the switching unit, or a neutral range (N-range) is maintained in a state that a neutral switch is being pressed.

However, in the parking device disclosed in JP03-006164U, to set the shift range to the N-range after releasing the automatic switching to the P-range at a stop of the vehicle, the driver needs to operate the ignition switch while he/she keeps pressing the neutral switch. Therefore, the switching operations are complicated and bothersome.

It is conceivable that the operation to release the automatic switching to the P-range and the operation to switch to the N-range at the stop of the vehicle may be executed separately. However, in case that the switching is executed by simple and easy operations, a problem may occur in which, without driver's intention, the switching operation to the P-range is automatically released and the shift range is switched to the N-range. Further, the driver himself/herself even does not become aware that the driver is doing such a switching operation.

SUMMARY OF THE INVENTION

The invention is developed to solve the above-described problem, and an object of the invention is to provide a vehicle control device and a method of controlling the vehicle control device which can release that a shift range is switched to a parking range automatically with a simple operation when a vehicle power source is off, and with which the driver himself/herself can recognize that such a switching release operation is being executed.

To attain the above-described object, in a first aspect of the invention, a vehicle control device includes a control unit that switches a shift range of an automatic transmission by an actuator based on a vehicle speed detected by a vehicle speed detection unit and an operation result of a shift range selection unit by a driver. The control unit switches the shift range to a parking range by the actuator automatically when a vehicle power source is turned off or a drive source is stopped in a state that the vehicle speed detected by the vehicle speed detection unit is equal to or less than a predetermined speed. The control unit notifies a driver via a notification unit when a predetermined shift range selection operation is executed by the shift range selection unit in a state that the vehicle power source is on or the drive source is being driven. The control unit maintains a neutral range when an operation in which the vehicle power source is turned off or the drive source is stopped is executed while the notification unit notifies.

Further, a method of controlling a vehicle control device having a control unit which switches a shift range of an automatic transmission by an actuator based on a vehicle speed detected by a vehicle speed detection unit and an operation result of a shift range selection unit by a driver is executed by the control unit. The method includes: switching the shift range by the actuator to a parking range automatically when a vehicle power source is turned off or a drive source is stopped in a state that the vehicle speed detected by the vehicle speed detection unit is equal to or less than a predetermined speed, notifying a driver via a notification unit when a predetermined shift range selection operation is executed by the shift range selection unit in a state that the vehicle power source is on and the drive source is being driven; and maintaining a neutral range when an operation in which the vehicle power source is turned off or the drive source is stopped is executed while the notification unit notifies.

According to the first aspect of the invention, in the state that the vehicle power source is on or the drive source is being driven, when the predetermined shift range selection operation by the shift range selection unit is executed, the notification unit notifies the driver. While a notification by the notification unit continues, when the vehicle power source is turned off or the drive source is stopped, the shift range can maintain a neutral range without being switched to a parking range automatically. Consequently, the invention can be operated simpler than the related art in which both the neutral range and the ignition switch need to be operated simultaneously.

Further, according to the first aspect of the invention, the neutral range is maintained with a simple operation when the vehicle power source is turned off or the drive source is stopped while the notification to the driver continues. Therefore, in case that the driver executes the predetermined shift range selection operation by mistake (unintentionally), the driver can be made aware by the notification and release of automatic switching to the parking range can be prevented.

In a second aspect of the invention, the predetermined shift range selection operation is an operation in which a selection operation for the neutral range by the shift range selection unit continues equal to or more than a first predetermined period.

According to the second aspect of the invention, when the selection operation for the neutral range continues equal to or more than the first predetermined period, the notification unit notifies the driver. Therefore, at the time of a normal shift switching operation, the notification to the driver is not executed. Thus, error notifications to the driver can be avoided.

In a third aspect of the invention, the control unit notifies the driver for a second predetermined period via the notification unit, stops a notification when the notification by the notification unit passes the second predetermined period, and switches the shift range to the parking range by the actuator automatically when the operation in which the vehicle power source is turned off or the drive source is stopped is executed after the notification stops.

According to the third aspect of the invention, to maintain the neutral range when the vehicle power source is off or the drive source is stopped, the vehicle power source must be turned off or the drive source must be stopped during the notification to the driver by the notification unit. Therefore, the driver must operate with intention, and thereby the unintentional error operations by the driver can be avoided.

Further, the neutral range is not maintained and the shift range is switched to the parking range automatically even if the vehicle power source is turned off or the drive source is stopped after the notification to the driver terminates. Therefore, the error operations by the driver can be further avoided.

In a fourth aspect of the invention, the vehicle control device further has at least either one of a power switch that operates to turn on/off the vehicle power source or a starter switch that operates to start/stop the drive source, and the notification unit blinks the power switch or the starter switch for the second predetermined period.

According to the fourth aspect of the invention, the driver can be easily aware that an operation to maintain the neutral range is being executed by notifying to blink the power switch or the starter switch as a necessary operation member for the driver. Therefore, the error operations by the driver can further be avoided.

In place of the blinking of the power switch or the starter switch, indications on a navigation screen or on a display section of a meter panel or the like can be conceived. However, since that the driver does not look at the screen or the display section when operating the power switch or the starter switch can be conceived, the blinking of the power switch or the starter switch at which the driver necessarily looks when the driver operates is effective measures ergonomically.

In a fifth aspect of the invention, when the neutral range is maintained in a state that the vehicle power source is turned off or the drive source is stopped, the control unit sets the vehicle power source partially in a start-up state for a third predetermined period and notifies the driver of a state where the neutral range is maintained.

According to the fifth aspect of the invention, since the driver can be notified that the neutral range is in a maintained state for the third predetermined period, the driver can certainly recognize that the neutral range is maintained.

In a sixth aspect of the invention, the control unit sets a power source necessary for an operation of the shift range selection unit in a start-up state when the neutral range is maintained in the state that the vehicle power source is turned off or the drive source is stopped, and switches the automatic transmission to the parking range when an operation to select the parking range by the shift range selection unit is executed.

According to the sixth aspect of the invention, when the neutral range is maintained in the state that the vehicle power source is off or the drive source is stopped, the parking range can be selected by a shift operation of the driver without executing a starting-up operation for the vehicle power source again. Therefore, the operation to switch to the parking range is facilitated.

In a seventh aspect of the invention, vehicle control device has a slope detection unit that detects a road slope, and the control unit switches to the parking range without maintaining the neutral range even if an operation to maintain the neutral range is executed in the state that the vehicle power source is turned off or the drive source is stopped when the road slope detected by the slope detection unit is equal to or more than a predetermined slope.

According to the seventh aspect of the invention, when the road slope is equal to or more than the predetermined slope, the shift range is switched to the parking range without maintaining the neutral range. Therefore, the vehicle can be prevented from moving due to the road slope.

In an eighth aspect of the invention, the control unit switches to the parking range automatically when the vehicle speed detected by the vehicle speed detection unit is equal to or more than a predetermined speed while the neutral range is maintained in the state that the vehicle power source is turned off or the drive source is stopped.

According to the eighth aspect of the invention, when the neutral range is maintained in the state that the vehicle power source is off or the drive source is stopped, for example, in case that the vehicle moves due to the road slope and a vehicle speed is equal to or more than the predetermined speed, the vehicle movement can be stopped by switching to the parking range automatically.

By a vehicle control device according to the invention, it is possible to release that the shift range is switched to a parking range automatically with a simple operation when a vehicle power source is off and to make a driver himself/herself recognize that such a switching release operation is being executed.

BRIEF DESCRIPTION OF THE DRAWINGS

FIG. 1 is a block diagram illustrating a structure of a vehicle control device according to an embodiment of the invention; and FIG. 2 is a control flowchart which the vehicle control device illustrated in FIG. 1 executes.

DETAILED DESCRIPTION OF THE PREFERRED EMBODIMENTS

An embodiment of the invention according to the invention will be described below in detail, referring to the accompanying drawings. FIG. 1 is a block diagram illustrating a structure of a vehicle control device according to an embodiment of the invention. FIG. 2 is a control flowchart which the vehicle control device illustrated in FIG. 1 executes.

As illustrated in FIG. 1, a vehicle has an SBW shifter (shift range selection unit or shift range selector) 12 of a shift by wire (SBW) type, a shifter ECU (control unit) 14, an automatic transmission 16, a transmission control unit (TCU) (control unit) 18, an engine ECU (control unit) 20, a power source ECU (power switch, control unit) 22, an engine drive/stop button (starter switch) 24, a vehicle speed sensor (vehicle speed detection unit) 26, a gyro sensor (road slope detection unit) 28, a notification unit (or device which provides visible and/or audible warnings to a driver) 30, and the like. The SBW shifter 12 electrically detects a shift range operation by a driver and switches a shift range by electric signals. The shifter ECU 14 controls the SBW shifter 12. The TCU 18 controls the automatic transmission 16 to switch the sift range. The vehicle speed sensor 26 detects a vehicle speed. The gyro sensor 28 detects a road slope. The notification unit 30 notifies the driver. The shifter ECU 14, the TCU 18, the engine ECU 20 and the power source ECU 22 are included in a vehicle control device 10.

The SBW shifter 12 may be either a button type which switches the shift range by pressing buttons or a lever type which switches the shift range by an operation of the driver with a shift lever. In the embodiment, the button type is conveniently used for explanations.

The SBW shifter 12 includes a P-range button which selects a parking range (P-range), an R-range button which selects a reverse range (R-range), an N-range button which selects a neutral range (N-range), a D-range button which selects a drive range (D-range), and the like.

The automatic transmission 16 has an actuator (not illustrated) which switches variable speed levels based on control of the TCU 18.

The shifter ECU 14, the TCU 18, the engine ECU 20 and the power source ECU 22 are constituted as known microcomputers having a CPU, a ROM, a RAM and the like, respectively. The CPU executes a control flowchart described later based on programs stored in the ROM or programs loaded in the RAM.

In a normal period, the engine drive/stop button 24 turns off in an off-state and turns on in an on-state after being pressed. Further, in the on-state, the engine drive/stop button 24 sends engine drive signals to the power source ECU 22 and the engine ECU 20, and thereby an engine is driven. Still further, in the off-state, the engine drive/stop button 24 sends engine stop signals to the power source ECU 22 and the engine ECU 20, and thereby the driven engine is stopped. When the engine drive/stop button 24 is pressed and the drive of the engine stops, the engine drive/stop button 24 sends the engine stop signals to the power source ECU 22. The power source ECU 22 turns off an entire vehicle power source based on the engine stop signals.

Yet further, the engine drive/stop button 24 itself may also function as the notification unit 30. It is possible to notify the driver by blinking an LED (not illustrated) provided in a casing of the engine drive/stop button 24. The engine ECU 20 can start or stop the blinking of the engine drive/stop button 24 by sending signals to the power source ECU 22.

The engine ECU 20 controls the drive/stop of the engine based on the engine drive signals and the engine stop signals from the engine drive/stop button 24.

The power source ECU 22 controls the vehicle power source to turn on/off based on the engine drive signals and the engine stop signals sent from the engine drive/stop button 24 to the power source ECU 22.

The gyro sensor 28 detects the road slope based on a tilt angle in a longitudinal direction. A yaw rate sensor, a G sensor or the like may be employed as a road slope detection unit in place of the gyro sensor 28.

The notification unit 30 notifies (makes the drive recognize) by sounds or indications to the driver. For example, the vehicle control device 10 may notify to the driver by sounds such as "bleeps" from a speaker as the notification unit 30 mounted in the vehicle or may notify by characters, signs or the like displayed on a display section as the notification unit 30 in an instrument panel. Further, the vehicle control device 10 may notify by the characters, the signs or the like displayed on a display section as the notification unit 30 in a navigation system. The notification unit 30 may use both the sounds and the indications.

The vehicle control device 10 according to the embodiment is basically constituted as described above. Operations and effects thereof will be explained below.

A control in the normal period will be explained.

When the vehicle speed detected by the vehicle speed sensor 28 is equal to or less than a predetermined speed and the driver presses the engine drive/stop button 24 to make a stop state of the engine, the engine ECU 20 drives the actuator (not illustrated) of the automatic transmission 16 via the TCU 18. The shift range is switched to the parking range (P-range) automatically by the actuator.

FIG. 2 is a control flowchart which the vehicle control device 10 according to the embodiment executes. When the vehicle speed detected by the vehicle speed sensor 28 is equal to or less than the predetermined speed and the vehicle is in a driving state of the engine where the engine drive/stop button 24 is not pressed by the driver, the shifter ECU 14 determines whether the N-range button of the SBW shifter 12 is pressed long for two second (or more) by the driver (step S1).

The long pressing operation on the N-range button by the driver functions as a predetermined shift selection operation by the SBW shifter 12. Further, the two seconds when the N-range button is pressed long functions as a first predetermined period, but the period is not limited to two seconds and may be a time frame during which the N-range button is continuously pressed more than a predetermined time.

When the shifter ECU 14 determines that the N-range button is pressed long for two seconds (Yes in step S1), the engine ECU 20 makes the engine drive/stop button 24 blink via the power source ECU 22 (step S2). In other words, the engine drive/stop button 24 starts to blink to notify the driver with the long pressing operation on the N-range button by the driver as a trigger.

During the blinking of the engine drive/stop button 24, the engine ECU 20 determines whether the engine drive/stop button 24 is pressed via the power source ECU 22 (step S3). When the engine ECU 20 determines that the engine drive/stop button 24 is pressed by the driver to be in the off-state during the blinking of the engine drive/stop button 24 (Yes in step S3), the engine ECU 20 releases that the shift range is switched to the P-range automatically via the TCU 18 and switches a transmission gear of the automatic transmission 16 to the N-range (to change gears) (step S4). Further, the engine ECU 20 makes the engine in the stopped state (step S5) and the control flowchart terminates.

On the other hand, when the engine ECU 20 determines that the engine drive/stop button 24 is not being pressed during the blinking of the engine drive/stop button 24 (No in step S3), the engine ECU 20 activates a timer (not illustrated) and determines whether three seconds pass since the engine drive/stop button 24 starts to blink (step S6). The "three seconds pass" functions as a passage of a second predetermined period.

When the engine drive/stop button 24 is being in the on-state without being pressed by the driver since the engine drive/stop button 24 starts to blink, and the engine ECU 20 determines that three seconds pass since the blinking starts (Yes in step S6), the blinking of the engine drive/stop button 24 stops (step S7), and then the process returns to step S1. Since notification period (blinking of the engine drive/stop button 24) to the driver passes over the second predetermined period, the notification is stopped.

On the other hand, when the engine drive/stop button 24 is not pressed by the driver since the engine drive/stop button 24 starts to blink and the engine ECU 20 determines that three seconds do not pass since the blinking starts (No in step S6), the process returns to step S2.

In step S1, when the sifter ECU 14 determines that the N-range button is not pressed long for two seconds (No in step S1), the engine ECU 20 further determines whether the engine drive/stop button 24 is pressed (step S8).

When the engine drive/stop button 24 is pressed by the driver (Yes in step S8), the engine ECU 20 switches the transmission gear of the automatic transmission 16 to the P-range (step S9) via the TCU 18 and makes the engine in the stopped stops (step S5). Then, the control flowchart terminates. On the other hand, when the engine drive/stop button 24 is not pressed by the driver (No in step S8), the process returns to step S1.

In the embodiment, when the long pressing operation (selection operation for a predetermined shift range) on the N-range button via the SBW shifter 12 is executed in the state that the engine (drive source) is being driven, the engine drive/stop button 24 blinks to notify the driver (see steps S1 and S2). When the engine drive/stop button 24 is pressed to be in the off-state for stopping the engine (drive source) during the blinking of the engine drive/stop button 24, the neutral range can be maintained without being switched to the parking range automatically (see steps S3 and S4). As a result, in the embodiment, the operations can be simplified compared with the related art in which both the neutral range and the ignition switch are operated simultaneously.

In case that an ignition switch (IG-S) is provided in the vehicle, the phase of "the vehicle power source is turned off" means that the ignition switch in the on-state is switched to an ACC state or the off-state in this case. Further, the phrase of "the drive source stops" means that the ignition switch in the on-state is switched to the ACC state, the off-state or an idle reduction state (ACC state) in this case.

Further, in the embodiment, when the engine (drive source) is stopped during the notification to the driver, the neutral range is maintained with the simple operations (steps S2 to S4). Therefore, even if the driver presses long on the N-range button by mistake (unintentionally), the driver can be made aware by the blinking of the engine drive/stop button 24 as the notification unit 30. Therefore, the release of the automatic switching to the parking range due to operation errors can be prevented.

Further, in the embodiment, when the N-range button is pressed long for two seconds, the driver is notified by starting the blinking of the engine drive/stop button 24. Therefore, in the normal shift switching operation, that the long pressing operation of the N-range button continues for two seconds is lowly probable, and the notification to the driver cannot be executed. Therefore, a notification error to the driver can be avoided.

Still further, in the embodiment, the engine must be stopped by pressing the engine drive/stop button 24 to be in the off-state during the blinking of the engine drive/stop button 24 (steps S2 and S3) to maintain the neutral range at the stop of the engine (drive source). Therefore, the driver needs to execute the predetermined shift range selection operation with driver's intention for operation, and thereby the operation errors by the driver can be avoided.

Still further, in the embodiment, when the engine (drive source) is stopped after the notification to the driver terminates, the neutral range is not maintained and the transmission gear is switched to the parking range automatically (steps S7, S8 and S9). Therefore, the operation errors by the driver can be further avoided.

Still further, in the embodiment, the driver can be easily made aware that an operation to maintain the neutral range will be executed by notifying to blink the engine drive/stop button 24 as a necessary operation member to the driver. Therefore, the operation errors by the driver can be further avoided.

In place of the blinking of the engine drive/stop button 24, indications on a navigation screen or on a display section of a meter panel or the like can be conceived. However, since that the driver does not look at the screen or the display section when operating the engine drive/stop button 24 can be conceived, the blinking of the engine drive/stop button 24 at which the driver necessarily looks when the driver operates is effective measures ergonomically.

A control after the control flowchart illustrated in FIG. 2 terminates will be explained.

When the neutral range is maintained in the state that the engine (drive source) stops, the power source ECU 22 delays the vehicle power source partially by a delay circuit (not illustrated). For example, the blinking of the engine drive/stop button 24 is continued for approximately only ten minutes (third predetermined time).

With the operations described above, after the engine stops, the driver is notified that the neutral range is maintained for approximately only ten minutes. Therefore, the driver can surely recognize that the neutral range is maintained. The notification to the driver after the engine stops is started by drive signals from the engine ECU 20. The notification may be executed via the indications on the display section in the navigation system, blinking of a hazard lamp, sounds from a speaker mounted in the vehicle to the driver, or the like. Further, after the engine stops, the engine ECU 20 sends control signals to the SBW shifter 12 via the shifter ECU 14 to turn on or blink the neutral range button of the SBW shifter 12 for a predetermined time to notify the driver.

Further, when the neutral range is maintained in the state that the engine (drive source) stops, the power source ECU 22 delays a predetermined power source necessary for operating the SBW shifter 12 by the delay circuit (not illustrated). When the driver operates to select the parking range in the SBW shifter 12, the automatic transmission 16 is switched to the parking range.

With the operations described above, when the neutral range is maintained in the state that the engine (drive source) stops, the parking range can be selected by the shift operation of the driver without executing a starting-up operation for the vehicle power source again. Therefore, the operation to switch to the parking range is facilitated.

Still further, when the road slope detected by the gyro sensor 28 is equal to or more than a predetermined slope, even if a predetermined operation in which the neutral range is maintained is executed in the off-state of the vehicle power source or at the stop of the engine (drive source), the engine ECU 20 switches to the parking range without maintaining the neutral range.

With the operation described above, when the road slope is equal to or more than the predetermined slope, the shift range is switched to the parking range without maintaining the neutral range. Therefore, the vehicle is prevented from moving due to the road slope.

Yet further, when the road slope detected by the gyro sensor 28 is equal to or more than the predetermined slope and the vehicle speed detected by the vehicle speed sensor 26 is equal to or more than a predetermined speed, the engine ECU 20 drives the actuator of the automatic transmission 16 via the TCU 18 to switch to the parking range automatically.

With the operations described above, in case that the neutral range is maintained in the state that the engine (drive source) stops, for example, when the vehicle moves due to the road slope and the speed thereof becomes equal to or more than a predetermined speed, the vehicle can be prevented from moving by switching to the parking range automatically.

What is claimed is:

1. A vehicle control device comprising: a control unit that switches a shift range of an automatic transmission by an actuator based on a vehicle speed detected by a vehicle speed sensor and an operation result of a shift range selector by a driver, wherein the control unit switches the shift range to a parking range by the actuator automatically when a vehicle power source is turned off or a drive source is stopped in a state that the vehicle speed detected by the vehicle speed sensor is equal to or less than a predetermined speed and, the control unit notifies the driver via a warning device when a predetermined shift range selection operation is executed by the shift range selector in a state that the vehicle power source is on or the drive source is being driven; and the control unit maintains a neutral range when an operation in which the vehicle power source is turned off or the drive source is stopped is executed while the warning device notifies.

2. The vehicle control device according to claim 1, wherein the predetermined shift range selection operation is an operation in which a selection operation for the neutral range by the shift range selector continues for a time period equal to or more than a first predetermined period.

3. The vehicle control device according to claim 2, wherein the control unit notifies the driver for a second predetermined period via the warning device, stops a notification when the notification by the warning device exceeds the second predetermined period, and switches the shift range to the parking range by the actuator automatically when the operation in which the vehicle power source is turned off or the drive source is stopped is executed after the notification stops.

4. The vehicle control device according to claim 1, wherein the control unit notifies the driver for a predetermined period via the warning device, stops a notification when the notification by the warning device exceeds the predetermined period, and switches the shift range to the parking range by the actuator automatically when the operation in which the vehicle power source is turned off or the drive source is stopped is executed after the notification stops.

5. The vehicle control device according to claim 4, further comprising:

a starter switch that operates to start/stop the drive source, wherein the warning device blinks an LED provided with the starter switch for the predetermined period.

6. The vehicle control device according to claim 1, wherein the control unit sets the vehicle power source partially in a start-up state for a predetermined period and notifies the driver of a state where the neutral range is maintained when the neutral range is maintained in the state that the vehicle power source is turned off or the drive source is stopped.

7. The vehicle control device according to claim 1, wherein the control unit sets a predetermined power source necessary for an operation of the shift range selector in a start-up state when the neutral range is maintained in the state that the vehicle power source is turned off or the drive source is stopped, and switches the automatic transmission to the parking range when an operation to select the parking range by the shift range selector is executed.

8. The vehicle control device according to claim 1, wherein the vehicle has a slope detector that detects a road slope, and the control unit switches to the parking range without maintaining the neutral range even if an operation to maintain the neutral range is executed in the state that the vehicle power source is turned off or the drive source is stopped when the road slope detected by the slope detector is equal to or more than a predetermined slope.

9. The vehicle control device according to claim 8, wherein the control unit switches to the parking range automatically when the vehicle speed detected by the vehicle speed sensor is equal to or more than the predetermined speed while the neutral range is maintained in the state that the vehicle power source is turned off or the drive source is stopped.

10. A method of controlling a vehicle control device having a control unit that switches a shift range of an automatic transmission by an actuator based on a vehicle speed detected by a vehicle speed sensor and an operation result of a shift range selector by a driver, the method executed by the control unit comprising:

switching the shift range to a parking range by the actuator automatically when a vehicle power source is turned off or a drive source is stopped in a state that the vehicle speed detected by the vehicle speed sensor is equal to or less than a predetermined speed, notifying the driver via a warning device when a predetermined shift range selection operation is executed by the shift range selector in a state that the vehicle power source is on or the drive source is being driven; and maintaining a neutral range when an operation in which the vehicle power source is turned off or the drive source is stopped is executed while the warning device notifies.

11. The method of controlling the vehicle control device according to claim 10, wherein the predetermined shift range selection operation is an operation in which a selection operation for the neutral range by the shift range selector continues for a time period equal to or more than a first predetermined period.

12. The method of controlling the vehicle control device according to claim 11, wherein the method further comprises: notifying the driver for a second predetermined period via the warning device; stopping the notification when the notification by the warning device exceeds the second predetermined period; and switching the shift range to the parking range by the actuator automatically when the operation in which the vehicle power source is turned off or the drive source is stopped is executed after the notification stops.

13. The method of controlling the vehicle control device according to claim 10, wherein the method comprises: notifying the driver for a predetermined period via the warning device; stopping a notification when the notification by the warning device passes the predetermined period; and switching the shift range to the parking range by the actuator automatically when the operation in which the vehicle power source is turned off or the drive source is stopped is executed after the notification stops.

14. The method of controlling the vehicle control device according to claim 13, vehicle control device further comprising:

a starter switch that operates to start/stop the drive source, wherein the method comprising:

blinking an LED provided with the starter switch for the predetermined period by the warning device.

15. The method of controlling the vehicle control device according to claim 10, wherein the method further comprises: setting the vehicle power source partially in a start-up state for a predetermined period; and notifying the driver of a state where the neutral range is maintained when the neutral range is maintained in the state that the vehicle power source is turned off or the drive source is stopped.

16. The method of controlling the vehicle control device according to claim 10, wherein the method further comprises: setting a predetermined power source necessary for an operation of the shift range selector in a start-up state when the neutral range is maintained in a state that the vehicle power source is turned off or the drive source is stopped; and switching the automatic transmission to the parking range when an operation to select the parking range by the shift range selector is executed.

17. The method of controlling the vehicle control device according to claim 10, wherein the vehicle has a slope detector that detects a road slope, and the method further comprises: switching to the parking range without maintaining the neutral range even if an operation to maintain the neutral range is executed in the state that the vehicle power source is turned off or the drive source is stopped when the road slope detected by the slope detector is equal to or more than a predetermined slope.

18. The method of controlling the vehicle control device according to claim 17, wherein the method further comprises: switching to the parking range automatically when the vehicle speed detected by the vehicle speed sensor is equal to or more than the predetermined speed while the neutral range is maintained in the state that the vehicle power source is turned off or the drive source is stopped.

* * * * *